INVENTOR.
EMANUEL M. AMIR,

Dec. 24, 1968  E. M. AMIR  3,418,389
PURIFICATION OF MESITYLENE
Filed April 18, 1966  3 Sheets-Sheet 3

INVENTOR.
EMANUEL M. AMIR,
BY
ATTORNEY.

United States Patent Office 3,418,389
Patented Dec. 24, 1968

3,418,389
PURIFICATION OF MESITYLENE
Emanuel M. Amir, Baytown, Tex., assignor to Esso
Research and Engineering Company
Filed Apr. 18, 1966, Ser. No. 543,380
12 Claims. (Cl. 260—674)

The present invention is directed to the purification of mesitylene which is 1,3,5-trimethylbenzene. More particularly, the invention is concerned with the recovery of mesitylene from an impurities-containing aromatic hydrocarbon fraction having a boiling range between about 80° to about 180° C. In its more specific aspects, the invention is concerned with the purification of mesitylene by selective alkylation of impurities.

The present invention may be briefly described as a process for recovering 1,3,5-trimethylbenzene from an aromatic hydrocarbon fraction, such as a $C_9$ aromatic hydrocarbon fraction, containing 1,3,5-trimethylbenzene in admixture with ortho-, meta-, and paraethyltoluenes and pseudocumene, together with other aromatic hydrocarbons, as alkylatable impurities. In the present invention, the impurities are alkylated with an organic alkylation agent containing more than two carbon atoms and containing no tertiary carbon atoms. The selective alkylation is conducted in the present of an acid catalyst to form an alkylate containing purified 1,3,5-trimethylbenzene and alkylated impurities. The purified 1,3,5-trimethylbenzene is recovered such as by distilling the alkylate.

The alkylation agent is an organic alkylation agent which contains more than two carbon atoms and contains no tertiary carbon atoms, both cyclic and acylic. The alkylation agent is preferably propylene, but the normal butenes such as 1- and 2-butenes, the normal pentenes such as 1- and 2-pentenes, the higher homologs of linear and cyclic olefins, the normal olefins, mixtures of the normal olefins, and the like, having up to 20 carbon atoms, may be used. There is no upper limit to chain length of the alkylating agent, however. Likewise, primary and secondary alcohols having from 3 to 20 carbon atoms may also be employed. Similarly, primary and secondary organic halides, such as isopropyl chloride, butyl and pentyl chlorides, and up to eicosyl chloride, and the like may be used. Primary and secondary mercaptans such as isopropyl mercaptan, secondary butyl mercaptan, and the like may also be employed.

The alkylation catalyst is preferably aluminum chloride but may be any of the Friedel-Crafts catalysts such as aluminum chloride, ferric chloride, stannic chloride, boron trifluoride and the like. The mineral acids such as sulfuric, phosphoric, and hydrofluoric may also be used.

When the alkylation catalyst is aluminum chloride, it may be used in an amount within the range from about 0.1 to about 20% by weight in the aromatic hydrocarbon.

The alkylation is conducted by reacting the aromatic hydrocarbon fractions containing 1,3,5-trimethylbenzene at suitable temperature and pressure conditions to maintain a liquid phase and to obtain alkylation. The amount of the alkylation agent may range from about 1 to 5 mols per mol of aromatic hydrocarbon impurities.

The preferred catalyst is aluminum chloride when the alkylation agent is an olefin or an alkyl halide. Temperatures within the range from about 25° to about 120° C. may be used with preferred temperatures in the range from 70° to 90° C. with aluminum chloride.

The feedstock may suitably contain from about 35% up to about 95% by volume of 1,3,5-trimethylbenzene. When the concentration of 1,3,5-trimethylbenzene is less than about 50%, the 1,3,5-trimethylbenzene is suitably purified and recovered in a two-stage alkylation operation wherein in the first stage it is purified up to about 90% by volume with removal of alkylated impurities, and in the second stage better than 99% by volume of 1,3,5-trimethylbenzene is obtained.

In Table I typical compositions of several mesitylene feeds are presented.

TABLE I.—COMPOSITION OF MESITYLENE FEEDS

| Compound | 95% | 85% | 82% | 35% |
|---|---|---|---|---|
| $C_8$ aromatics | | | 1.88 | |
| m-/p-Ethyltoluene | 1.61 | 4.58 | 6.19 | 23.00 |
| Propylbenzenes | | | 2.64 | |
| Mesitylene | 94.81 | 84.79 | 81.84 | 34.35 |
| o-Ethyltoluene | 2.29 | 6.20 | 1.10 | 28.50 |
| Pseudocumene | 1.29 | 4.43 | 5.43 | 14.15 |
| Other $C_9$ aromatics | | | 0.54 | |
| $C_{10}$ aromatics | | | 0.38 | |

However, the invention is not limited to these particular feeds and any aromatic hydrocarbon fraction containing 1,3,5-trimethylbenzene and boiling within the range of 80°–180° C. may be purified in accordance with the present invention.

The present invention will be further illustrated by reference to the drawing illustrating preferred modes and embodiments in which.

Figure 1:
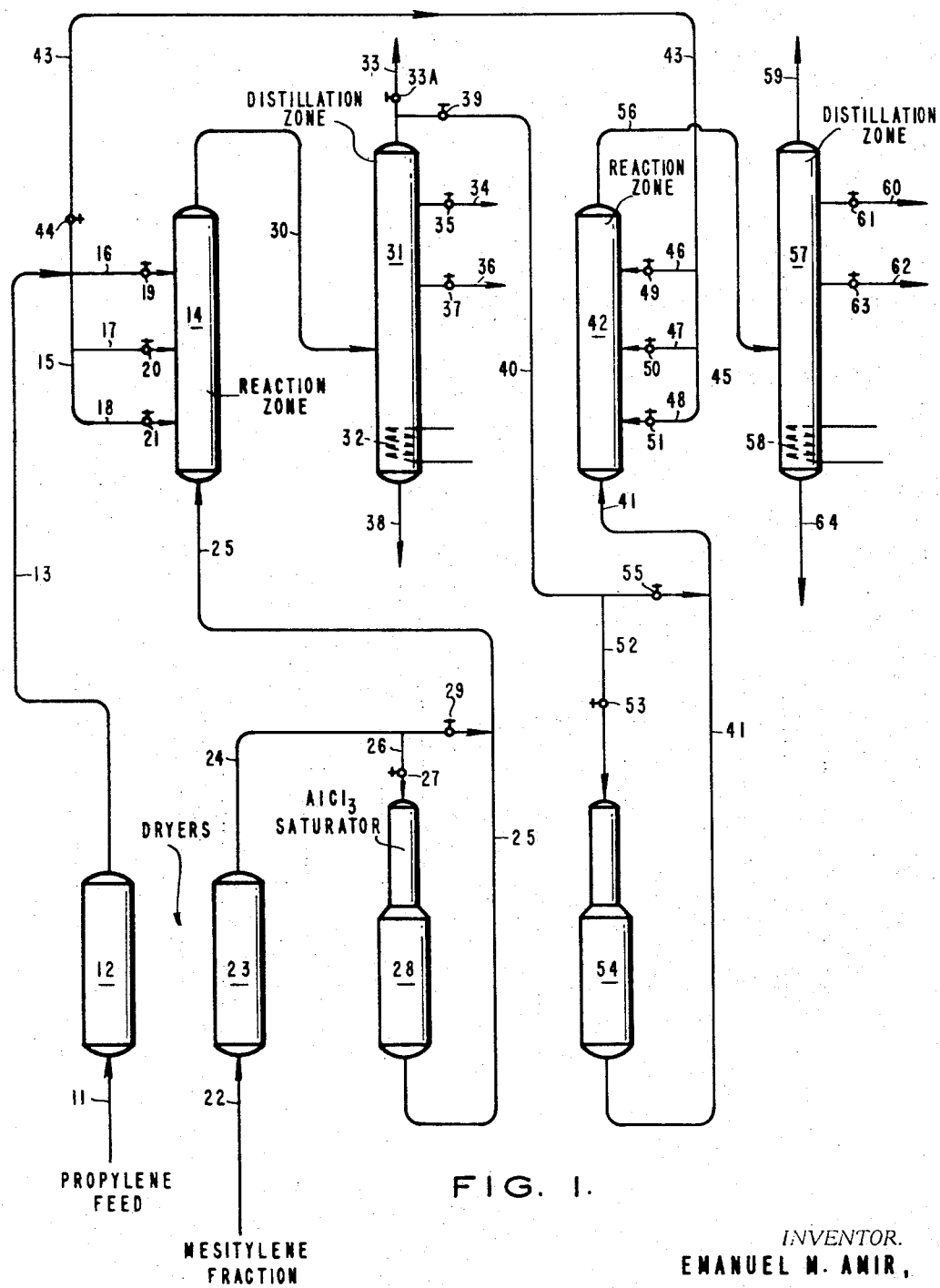
FIG. 1 is a flow diagram of one operation.

Referring now to FIG. 1, numeral 11 designates a charge line by way of which a propylene feed is introduced into the system from a source not shown. The propylene feed may be purified propylene or may be a propylene-containing feedstock which may contain some impurities. Likewise, the propylene-containing feed may also contain some propane. The propylene-containing feed is suitably dried in a drier 12 to a moisture content within the range from about 5 to about 50 p.p.m., and the dried propylene feed is suitably introduced by way of line 13 into a reaction zone 14 in which conditions obtain for alkylation of impurities. The propylene feed may be introduced into manifold 15 containing branch lines 16, 17 and 18 controlled, respectively, by valves 19, 20 and 21 for introduction of the propylene at a single point or at a plurality of points as may be desired. Also, there is introduced into the system by way of line 22 a $C_9$ aromatic hydrocarbon fraction containing mesitylene and impurities such as ortho-, meta-, and paraethyltoluene and pseudocumene. This fraction is also dried in drier 23 to a water content which may be within the range from about 5 to about 50 p.p.m., with the dried $C_9$ aromatic hydrocarbon fraction being introduced by line 24, controlled by valve 29, into line 25 and thence into reaction zone 14 for reaction with the propylene introduced by line 13.

In this mode of the present invention, a portion of the $C_9$ aromatic hydrocarbon fraction from line 24 may be bypassed into branch line 26 controlled by valve 27 through an aluminum chloride saturator 28 containing a bed of aluminum chloride. The bypassed portion of the $C_9$ aromatic hydrocarbon fraction dissolves aluminum chloride and this portion of the feed is then withdrawn by line 25 for admixture with the portion in line 24.

In zone 14, under the stated conditions, the ortho-, meta- and paraethyltoluene and pseudocumene are selectively alkylated, and the mesitylene remains unaffected. Thus, by selective alkylation of the impurities, it is possible to recover the purified mesitylene. The alkylated product is withdrawn from zone 14 by line 30 and introduced thereby into distillation zone 31 illustrated as a single fractional distillation tower, but which may be a plurality of fractional distillation towers. Fractional distillation zone 31 is provided with a heating means illustrated by steam coil 32 but which may be an external reboiler. Zone 31 is also provided with line 33, controlled by valve 33A, for withdrawal of the overhead fraction, line 34 controlled by valve 35 for withdrawal of a side stream fraction, line 36 controlled by valve 37 for withdrawal of a side stream fraction, and line 38 for discharge of a bottoms fraction.

When the purity of the mesitylene fraction introduced by line 22 is 85% mesitylene or better, the product is withdrawn by line 33, controlled by valve 33A, with the bottoms fraction being discharged by line 38. However, when the purity of the mesitylene fraction is less than about 85%, say within the range of 35' to 50% mesitylene, the stream withdrawn by line 33 may contain about 90% by volume mesitylene and, in this event, valve 33A would be closed and valve 39 in line 40 opened allowing this stream to be further alkylated by introduction into line 41, and thence into a second reaction zone 42 into which an alkylation agent such as propylene is introduced by line 43 by opening valve 44. In zone 42 conditions also prevail for alkylation of impurities. A manifold 45 composed of branch lines 46, 47 and 48, controlled, respectively, by valves 49, 50 and 51, allows the propylene to be introduced into reaction zone 42 at a single or plurality of points as may be desired.

A portion of the stream in line 40 may be bypassed by way of line 52, controlled by valve 53, into aluminum chloride saturator 54, which contains a bed of aluminum chloride, allowing the adjustment of aluminum chloride in the stream introduced by line 41 into zone 42. Valve 55 allows control of the amount of the stream in line 40 for control of the amount of aluminum chloride.

In reaction zone 42, the residual impurities are alkylated and the alkylated product is withdrawn by line 56 into a second distillation zone 57, which is similar to distillation zone 31 and is provided with heating means such as steam coil 58, line 59 for withdrawal of purified mesitylene, line 60 controlled by valve 61 for withdrawal of a side stream as desired, line 62 controlled by valve 63 for withdrawal of another side stream, and line 64 for discharge of a bottoms fraction.

From the foregoing description taken with the drawing, it will be seen that a simple, efficient process is provided by way of which mesitylene may be purified in a single stage or a plurality of stages by selective alkylation of the impurities in a $C_9$ aromatic hydrocarbon fraction containing mesitylene.

Figure 2:
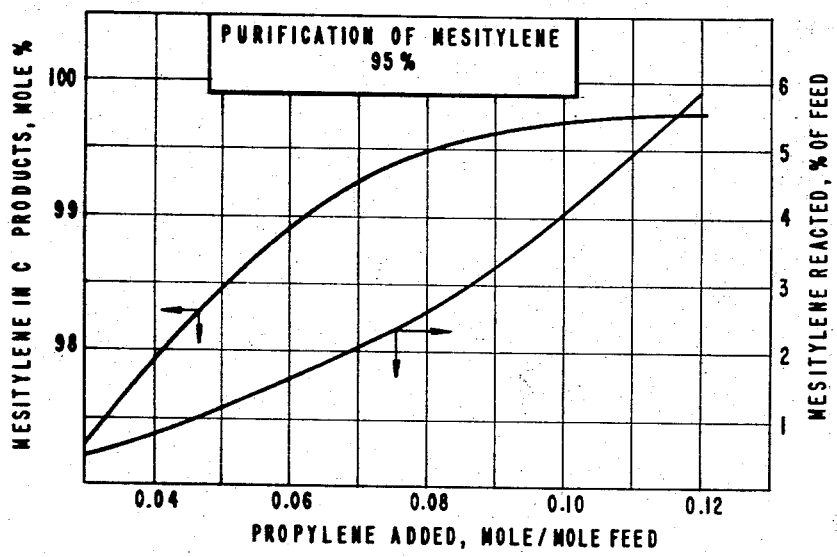
FIG. 2 is a plot of data showing the purification of a feedstock containing 95% mesitylene in another operation.

In order to illustrate the invention further, reference is had to FIG. 2 which is a plot of data showing the percentage of mesitylene in the $C_9$ fraction of alkylation product against the amount of propylene added. A separate curve in FIG. 2 shows the amount of mesitylene reacted as a percentage of the feed.

From FIG. 2 it will be clear that with a 95% mesitylene-containing fraction, purities above 99% mesitylene may be obtained with less than 2% of the mesitylene reacted.

Figure 3:
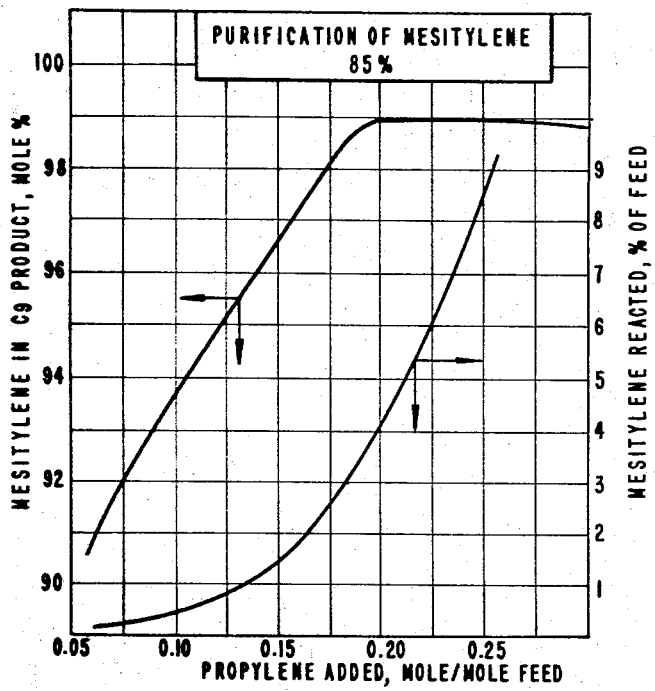
FIG. 3 is a similar plot of data showing the similar purification of a feedstock containing 85% mesitylene.

Similarly, by reference to FIG. 3, 99% purity may be obtained from a feedstock containing 85% mesitylene with about 4% mesitylene reacted.

Figure 4:
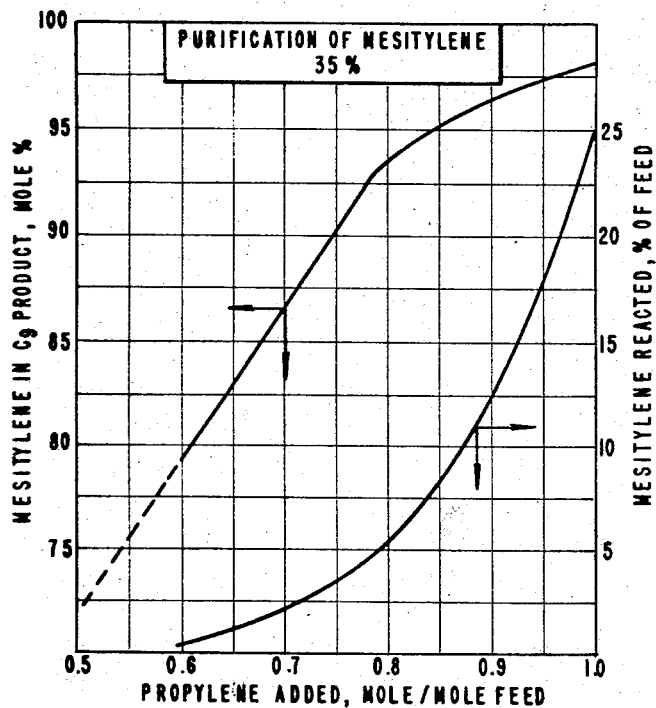
FIG. 4 is a similar plot of data showing the purification of a feedstock containing 35% mesitylene.

By reference to FIG. 4, it will be seen that, starting with 35% mesitylene, purities of mesitylene of 90% may be obtained with about 3% of the mesitylene reacted. At higher purities, there is a sacrifice of greater amounts of mesitylene. It is to be noted in FIGS. 2 to 4 that the amount of propylene added as mol per mol of feed is relatively small.

In accordance with the present invention, the conditions of temperature to produce 99% plus mesitylene are illustrated in Table II. In this particular instance, the feedstock contained about 95% mesitylene.

TABLE II.—PURIFICATION OF MESITYLENE
[AlCl₃: 0.5 wt. percent]

| Reaction Temp., °C | 35 | 30 | 55 | 70 | 80 | 100 |
|---|---|---|---|---|---|---|
| C₃=Added, mol/mol C₉ | 0.29 | 0.18 | 0.12 | 0.96 | 0.06 | 0.06 |
| C₉ Arom. in Prod., mol percent | | | | | | |
| m-/p-Ethyltoluene | 0.38 | 0.31 | 0.19 | 0.13 | 0.22 | 0.08 |
| Mesitylene | 99.62 | 99.19 | 99.32 | 99.49 | 99.32 | 99.24 |
| o-Ethyltoluene | 0 | 0.35 | 0.23 | 0.17 | 0.21 | 0 |
| Pseudocumene | 0 | 0.15 | 0.26 | 0.21 | 0.25 | 0.68 |
| | 100.00 | 100.00 | 100.00 | 100.00 | 100.00 | 100.00 |
| Mesitylene Reacted, mol percent | 22.60 | 12.17 | 5.77 | 0.85 | 0.89 | 1.31 |

From these data, it will be seen that at temperatures in the range from about 55° to about 100° C., high purity mesitylene was obtained with very little reaction of mesitylene. In short, there was selective alkylation of the ortho-, metal- and paraethyltoluene and pseudocumene.

The present invention will be further illustrated by reference to alkylation of an aromatic hydrocarbon fraction containing nominally "82%" mesitylene and $C_8$ to $C_{10}$ aromatic hydrocarbons in a batch operation at 50° C., 1% by weight of $AlCl_3$ based on the aromatic hydrocarbon fraction. The results are shown in Table III.

TABLE III

| Feed | Mol percent | Products: $C_8$–$C_{10}$ After Alkylation with 24 mol percent sec.-Butyl Chloride |
|---|---|---|
| m- and p-Xylene | 0.11 | 0 |
| o-Xylene | 1.77 | 0 |
| Isopropylbenzene | 0.71 | 0 |
| n-Propylbenzene | 1.93 | 0 |
| m- and p-Ethyltoluene | 6.19 | 0.08 |
| Mesitylene | 81.84 | 99.44 |
| o-Ethyltoluene | 1.10 | 0 |
| Pseudocumene | 5.43 | 0.48 |
| Indan | 0.09 | 0 |
| Hemimellitine | 0.45 | 0 |
| $C_{10}$ Aromatics; Cymenes and butylbenzenes | 0.38 | 0 |

This example shows that $C_8$ and all the $C_9$'s (other than mesitylene) are removed by alkylation. Also some low boiling $C_{10}$ aromatics, such as the symenes and butylbenzenes, were removed.

In other batch operations the "95%" purity mesitylene of Table I was purified by alkylation with several alkylation agents. These results are presented in Table IV.

TABLE IV

| Alkylating Agent | Propylene | | | | | Isopropyl Chloride | sec.-Butyl Chloride |
|---|---|---|---|---|---|---|---|
| Amount Added, Mol percent | 18 | 12 | 6 | 6 | 6 | 7.5 | 7.5 |
| Temp., °C | 30 | 55 | 70 | 80 | 100 | 50 | 50 |
| $C_9$ Arom. in Products: | | | | | | | |
| m- and p-Ethyltoluene | 0.31 | 0.19 | 0.13 | 0.22 | 0.08 | 0.37 | 0.18 |
| Mesitylene | 99.19 | 99.32 | 99.49 | 99.32 | 99.24 | 99.15 | 99.24 |
| o-Ethyltoluene | 0.35 | 0.23 | 0.17 | 0.21 | 0 | 0.22 | 0.01 |
| Pseudocumene | 0.15 | 0.26 | 0.21 | 0.25 | 0.68 | 0.26 | 0.57 |
| Mesitylene Consumed in Alkylation | 12.8 | 6.2 | 1.8 | 1.8 | 1.8 | 1.2 | 1.2 |

The same "95%" purity mesitylene was also alkylated using 2-butene and 2-pentene as alkylation agents with the results being shown in Table V.

TABLE V

| Alkylating Agent | 2-butene | | | 2-pentene | | |
|---|---|---|---|---|---|---|
| Amount Added, Mol Percent | 13.4 | 9 | 9 | 17 | 11.4 | 11.4 |
| Temp., °C | 35 | 50 | 70 | 35 | 50 | 70 |
| $C_9$ Arom. in Products: | | | | | | |
| m-/ p-Ethyltoluene | 0.35 | 0.23 | 0 | 0.58 | 0.30 | 0.14 |
| Mesitylene | 99.48 | 99.72 | 99.88 | 99.01 | 99.42 | 99.66 |
| o-Ethyltoluene | 0.17 | 0 | 0 | 0.28 | 0.15 | 0 |
| Pseudocumene | 0 | 0.05 | 0.12 | 0.13 | 0.13 | 0.20 |
| Mesitylene Consumed in Alkylation | 7.1 | 2.8 | 1.3 | 5.5 | | 0.7 |

Additional batch runs were made at various temperatures using propylene, 2-butene, and cyclopentene as the alkylation agent in purifying an 84% mesitylene fraction. The results of these runs are shown in Table VI.

TABLE VI

| Alkylating Agent | Propylene | | 2-butene | | Cyclopentene |
|---|---|---|---|---|---|
| Amount Added, Mol Percent | 24 | 24 | 18 | 18 | 25 |
| Temp., °C | 71 | 80 | 50 | 70 | 50 |
| $C_9$ Arom. in Product: | | | | | |
| m-/ p-Ethyltoluene | 0 | 0 | 0.18 | 0 | 0 |
| Mesitylene | 99.2 | 99.11 | 99.42 | 99.30 | 99.50 |
| o-Ethyltoluene | 0 | 0 | 0.12 | 0 | 0.08 |
| Pseudocumene | 0.98 | 0.89 | 0.28 | 0.70 | 0.42 |
| Mesitylene Consumed in Alkylation | 7.7 | 7.1 | 1.0 | 0.9 | |

It will be clear from all of these runs that mesitylene is obtained in purified form with selective removal of alkylated impurities with very little if any significant alkylation or consumption of mesitylene.

In the present invention, the reaction product may be further treated such as by filtration, water washing, and/or neutralization of any residual acidity with ammonia or sodium hydroxide and the like. This subsequent treatment may be in combination with or prior to fractional distillation, as has been illustrated. Thus, in accordance with the present invention, purified mesitylene is obtained by selective alkylation of impurities in the presence of acid catalysts.

It is understood that the foregoing examples are given by way of illustration and not by way of limitation, and the invention is not to be restricted to any particular exemplary mode or embodiment.

The nature and objects of the present invention having been completely described and illustrated and the best mode and embodiment contemplated set forth, what I wish to claim as new and useful and secure by Letters Patent is:

1. A process for recovering 1,3,5-trimethylbenzene from an impurities-containing aromatic hydrocarbon fraction containing 1,3,5-trimethylbenzene and boiling within the range from about 80° to about 180° C. which comprises:

selectively alkylating said impurities with an organic alkylation agent containing more than two carbon atoms and no tertiary carbon atoms;
in the presence of an acid catalyst;
to form an alkylate containing purified 1,3,5-trimethylbenzene and alkylated impurities; and
recovering said purified 1,3,5-trimethylbenzene.

2. A method in accordance with claim 1 in which the alkylation agent is propylene.

3. A method in accordance with claim 1 in which the alkylating agent is normal butenes.

4. A method in accordance with claim 1 in which the alkylating agent is normal pentenes.

5. A method in accordance with claim 1 in which the alkylating agent is a mixture of normal olefins.

6. A method in accordance with claim 1 in which the acid catalyst is aluminum chloride.

7. A method in accordance with claim 1 in which the temperature is within the range from about 25° to about 120° C.

8. A method in accordance with claim 1 in which the 1,3,5-trimethylbenzene is recovered by distillation of the alkylate.

9. A method in accordance with claim 1 in which:
(a) the catalyst is aluminum chloride;
(b) the temperature is within the range from about 55° to about 100° C.; and
(c) the alkylation agent is propylene.

10. A method in accordance with claim 1 in which the aromatic hydrocarbon fraction contains from about 35% to about 95% by volume of 1,3,5-trimethylbenzene.

11. A method in accordance with claim 1 in which the aromatic hydrocarbon fraction contains from about 35% to about 50% 1,3,5-trimethylbenzene and said recovered 1,3,5-trimethylbenzene is about 90% purity and is purified to at least about 99% purity by repeating said steps of selective alkylation and recovering purified 1,3,5-trimethylbenzene.

12. A method in accordance with claim 1 in which the catalyst is from about 0.1% to about 20% by weight of $AlCl_3$ in said aromatic hydrocarbon.

References Cited
UNITED STATES PATENTS 2,816,940  12/1957  Schlatter _____ 260—674
2,929,856  3/1960   Wadsworth _____ 260—674
3,052,741  9/1962   Pierri et al. _____ 260—674

DELBERT E. GANTZ, Primary Examiner.

C. E. SPRESSER, Jr., Assistant Examiner.

U.S. Cl. X.R.
260—671